US007471395B2

United States Patent
Wu

(12) United States Patent
(10) Patent No.: US 7,471,395 B2
(45) Date of Patent: Dec. 30, 2008

(54) LIGHT-EMITTING MODULE AND METHODS FOR OPTICALLY ALIGNING AND ASSEMBLING THE SAME

(75) Inventor: Ming-Che Wu, Chia-Yi (TW)

(73) Assignee: Universal Scientific Industrial Co., Ltd. (TW)

( * ) Notice: Subject to any disclaimer, the term of this patent is extended or adjusted under 35 U.S.C. 154(b) by 54 days.

(21) Appl. No.: 11/693,248

(22) Filed: Mar. 29, 2007

(65) Prior Publication Data

US 2008/0239320 A1  Oct. 2, 2008

(51) Int. Cl.
*G01B 11/00* (2006.01)
*G01C 1/00* (2006.01)

(52) U.S. Cl. .................. 356/399; 356/139.04; 356/400

(58) Field of Classification Search .................. 356/138, 356/139, 139.04, 399, 400
See application file for complete search history.

(56) References Cited

U.S. PATENT DOCUMENTS 6,757,063 B2 * 6/2004 Kogan et al. ................. 356/399

7,271,402 B1 * 9/2007 Wu ............................. 250/553

\* cited by examiner

*Primary Examiner*—L. G Lauchman
(74) *Attorney, Agent, or Firm*—Ostrolenk, Faber, Gerb & Soffen, LLP

(57) ABSTRACT

An optical alignment method is for a light-emitting module that includes a housing unit, a light-emitting unit disposed in the housing unit, and a lens unit. The optical alignment method includes: (a) through image-capturing techniques, finding a light-emitting point of the light-emitting unit and a predetermined reference point, and determining a total optical path length between the light-emitting point and an imaging plane; (b) finding a first center line that divides the total optical path length in half; (c) through image-capturing techniques, finding opposite first and second edges of the lens unit, and determining a lens length between the first and second edges; (d) finding a second center line that divides the lens length in half; and (e) assembling the lens unit to the housing unit so that the first and second center lines overlap. A light-emitting module and an assembly method therefor are also disclosed.

8 Claims, 13 Drawing Sheets

LIGHT-EMITTING MODULE AND METHODS FOR OPTICALLY ALIGNING AND ASSEMBLING THE SAME

BACKGROUND OF THE INVENTION

1. Field of the Invention

The present invention relates to a light-emitting module. More particularly, the present invention relates to a light-emitting module, an optical alignment method for the light-emitting module, and an assembly method for the light-emitting module, in which an automated process is used to simplify and enhance the precision of optical alignment and assembly of the light-emitting module.

2. Description of the Related Art

A conventional optical output device, such as a printer or a photocopier, uses a light-emitting module to emit a light image on a photosensitive drum, such that the photosensitive drum generates an electric potential to adsorb carbon powder. The adsorbed carbon powder is subsequently transferred to paper. Lasers and light-emitting diode (LED) arrays are examples of light sources used by the light-emitting module. Compared to the more traditional laser-type output device, the LED array-type output device is smaller, allows for faster printing and copying, and has a lower cost.

Referring to FIGS. 1 and 2, a conventional light-emitting module 1 utilizing an LED array as a light source includes a housing unit 11, a light-emitting unit 12, and a lens unit 13. The housing unit 11 includes an outer housing 111 and extends along a direction (X) and having an approximately U-shaped cross section, and an inner support 112 mounted within the outer housing 111 and also extending along the direction (X). The light-emitting unit 12 is mounted within the outer housing 111 and extends along the direction (X). The light-emitting unit 12 includes a substrate 122, and a plurality of light-emitting elements 121 disposed on the substrate 122 and arranged spacedly along the direction (X). The lens unit 13 is inserted into a groove 1121 formed along a top face of the inner support 112. The light generated by the light-emitting elements 121 passes through the lens unit 13 and is focused onto an imaging plane 2 (e.g., on a photosensitive drum).

Since the resolution of the optical output device to which the light-emitting module 1 is applied is determined primarily by the accuracy with which the imaging plane 2 is realized, it is extremely important that the light-emitting unit 12 and the lens unit 13 be aligned precisely. In the conventional light-emitting module 1, optical alignment adjustment is performed manually. Such manual adjustment is referred to as "active alignment."

Inactive alignment, the outer housing 111, the inner support 112, and the light-emitting unit 12 are first combined into a single assembly. The light-emitting elements 121 are subsequently driven to produce light. Next, using a charge-coupled device (CCD) on the imaging plane 2, a spot size of the light passed through the lens unit 13 and focused and irradiated onto the CCD is observed. Finally, in a state where the light-emitting unit 12 and the CCD are fixed in position, the relative positioning between the light-emitting unit 12 and the lens unit 13 is manually adjusted along six degrees of freedom (along the X, Y, and Z axes and rotational) until the optimum optical quality is obtained. The lens unit 13 is subsequently adhered to the inner support 112 in this optimum position, thereby completing optical alignment and assembly. However, such a conventional optical alignment and assembly method has the following drawbacks:

1. Such manual active alignment in the six degrees of freedom is a slow process. For example, 20 to 25 minutes maybe required to assemble and align each light-emitting module 1. This increases the cost of producing the light-emitting module 1.

2. During optical alignment of the lens unit 13 along the six degrees of freedom, a complicated six-axis control mechanism is needed. Further, during testing, it is necessary to utilize an illumination control module for driving the light-emitting unit 12. Also, a highly precise and stable measurement platform is required. All this translates into higher production costs for the conventional light-emitting module 1.

SUMMARY OF THE INVENTION

Therefore, the object of this invention is to provide a light-emitting module, an optical alignment method for the light-emitting module, and an assembly method for the light-emitting module, in which an automated process is used to simplify and enhance the precision of optical alignment and assembly of the light-emitting module.

According to one aspect, the optical alignment method of this invention is applied to a light-emitting module that includes a housing unit, a light-emitting unit disposed in the housing unit, and a lens unit. The optical alignment method comprises:

(a) through image-capturing techniques, finding a light-emitting point of the light-emitting unit and a predetermined reference point, and determining a total optical path length between the light-emitting point and an imaging plane having a predetermined distance relation with the predetermined reference point;

(b) finding an imaginary first center line located at a position that divides the total optical path length into equal half distances;

(c) through image-capturing techniques, finding first and second edges of the lens unit that are opposite to each other in a direction of an optical path of light emitted by the light-emitting unit from the light-emitting point to the imaging plane, and determining a lens length between the first and second edges;

(d) finding an imaginary second center line located at a position that divides the lens length into equal half distances; and (e) assembling the lens unit to the housing unit in such a manner that the imaginary second center line coincides with the imaginary first center line.

According to another aspect of this invention, the assembly method of this invention comprises, prior to step (a) of the optical alignment method, mounting the light-emitting unit in the housing unit such that a slot formed in the housing unit is on a plane parallel to the optical path, and, in step (e) of the optical alignment method, assembling the lens unit to the housing unit via the slot.

According to yet another aspect of this invention, the light-emitting module comprises:

a light-emitting unit having a light-emitting point that emits light along an optical path;

a housing unit in which the light-emitting unit is disposed and that is formed with a slot located on a plane parallel to the optical path; and a lens unit disposed in the housing unit such that the optical path passes through the lens unit, the lens unit having opposite first and second edges intersected by the optical path;

wherein the slot in the housing unit permits use of image-capturing techniques to find the light-emitting point and a predetermined reference point for determining a total optical path length between the light-emitting point and an imaging plane having a predetermined distance relation with the predetermined reference point; and wherein an imaginary first center line located at a position that divides the total optical path length into equal half distances is coincident with an imaginary second center line located at a position that divides a lens length between the first and second edges of the lens unit into equal half distances.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
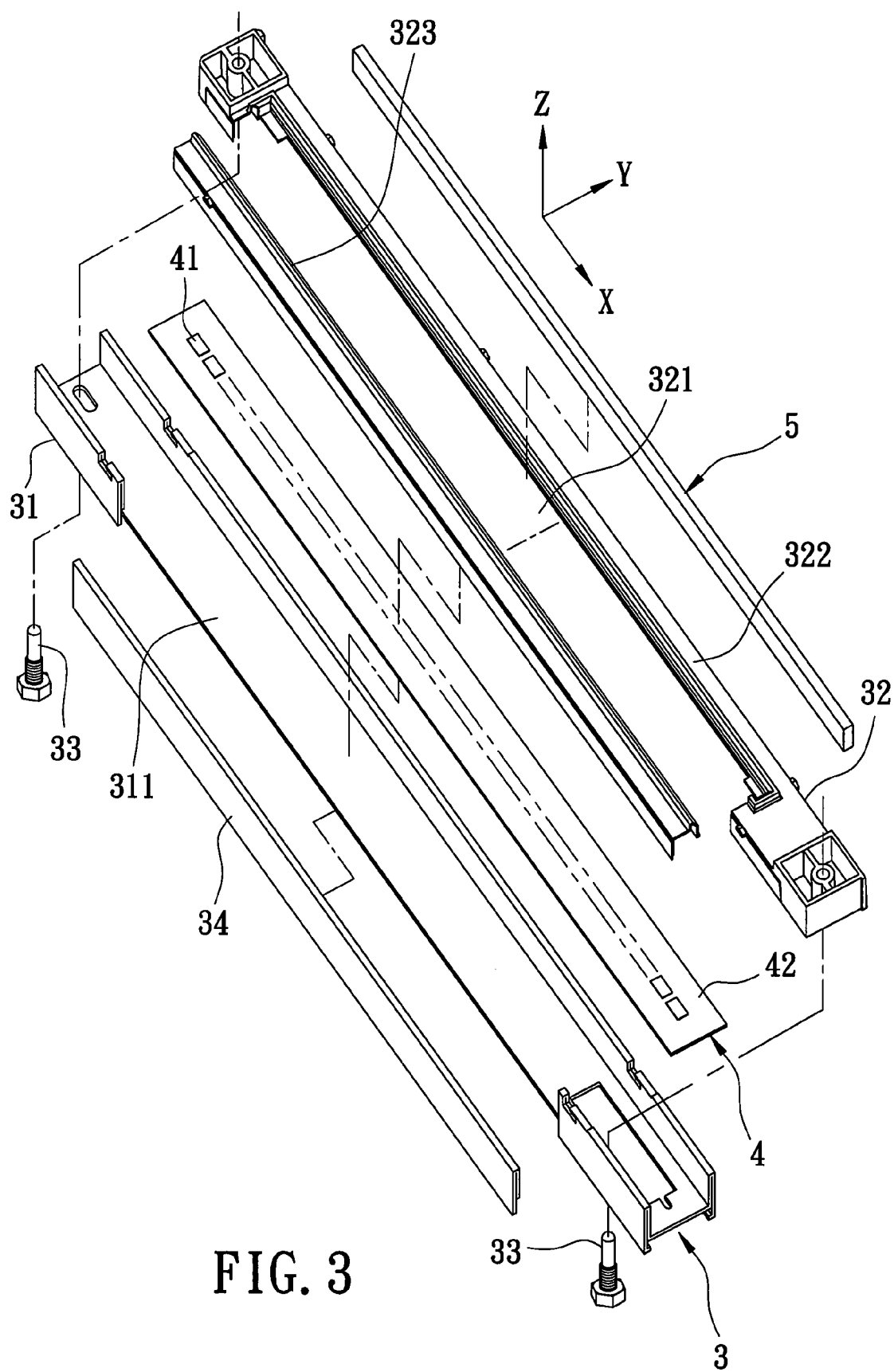
FIG. 3 is an exploded perspective view of a light-emitting module according to a preferred embodiment of the present invention.
Figure 4:
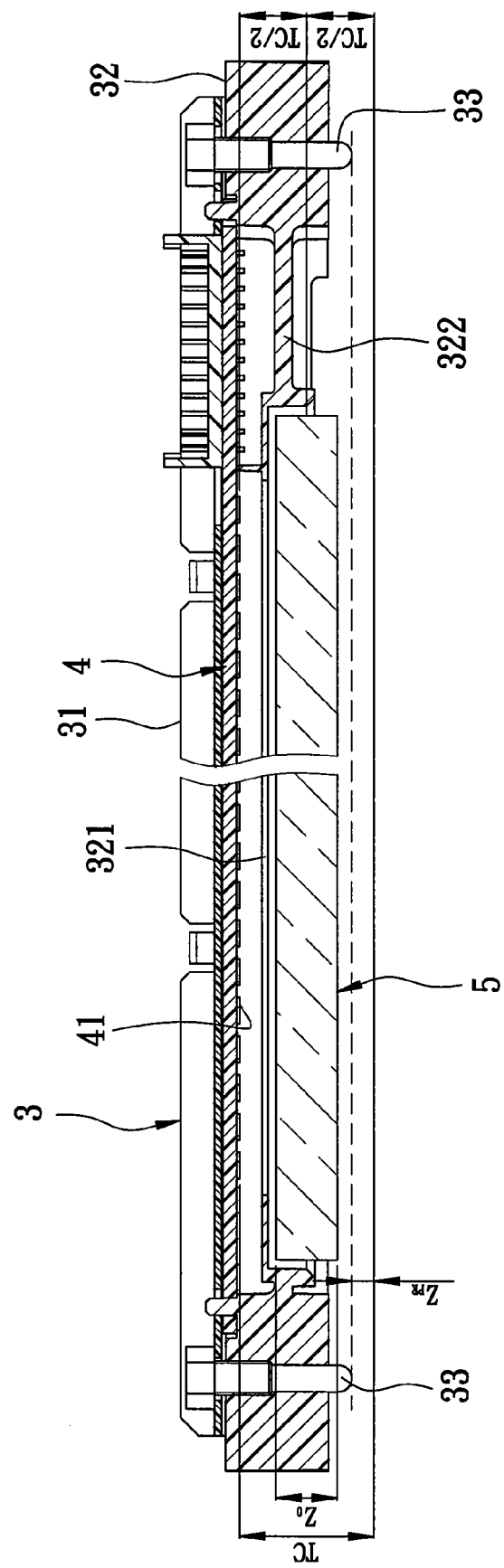
FIG. 4 is a sectional view of the light-emitting module of FIG. 3 in an assembled state.

Referring to FIGS. 3 and 4, a light-emitting module according to a preferred embodiment of the present invention includes a housing unit 3, a light-emitting unit 4, and a lens unit 5.

The housing unit 3 includes an outer housing 31 extending along a first direction (X) and having an approximately U-shaped cross section, an inner support 32 extending along the first direction (X) and disposed in the outer housing 31, a pair of fasteners 33 for interconnecting the outer housing 31 and the inner support 32 respectively at opposite ends thereof, and a cover plate 34. The outer housing 31 is formed with a slot 311 in one side thereof and extending along the first direction (X). The inner support 32 includes first and second members 322, 323 coupled to one another to define a groove 321 therebetween. During assembly, the second member 323 is insertable into the outer housing 31 via the slot 311 for detachable coupling to the first member 322. The cover plate 34 detachably covers the slot 311 in the outer housing 31.

The light-emitting unit 4 is mounted to the outer housing 31. The light-emitting unit 4 includes a substrate 42, and a plurality of light-emitting points 41 that are arranged spacedly along the first direction (X) on the substrate 42 and that emit light along an optical path (Z), which is perpendicular to the first direction (X), and onto an imaging plane 9 (see FIG. 12). The slot 311 in the outer housing 31 of the housing unit 3 is on a plane parallel to the optical path (Z). In this embodiment, each of the light-emitting points 41 is a light-emitting diode.

The lens unit 5 is disposed in the housing unit 3 such that the optical path (Z) passes through the lens unit 5. That is, in this embodiment, the lens unit 5 is inserted in the groove 321 defined between the first and second members 322, 323 of the inner support 32, such that the inner support 32 of the housing unit 3 supports the lens unit 5 in the outer housing 31 between the light-emitting unit 4 and the imaging plane 9.

Figure 5:
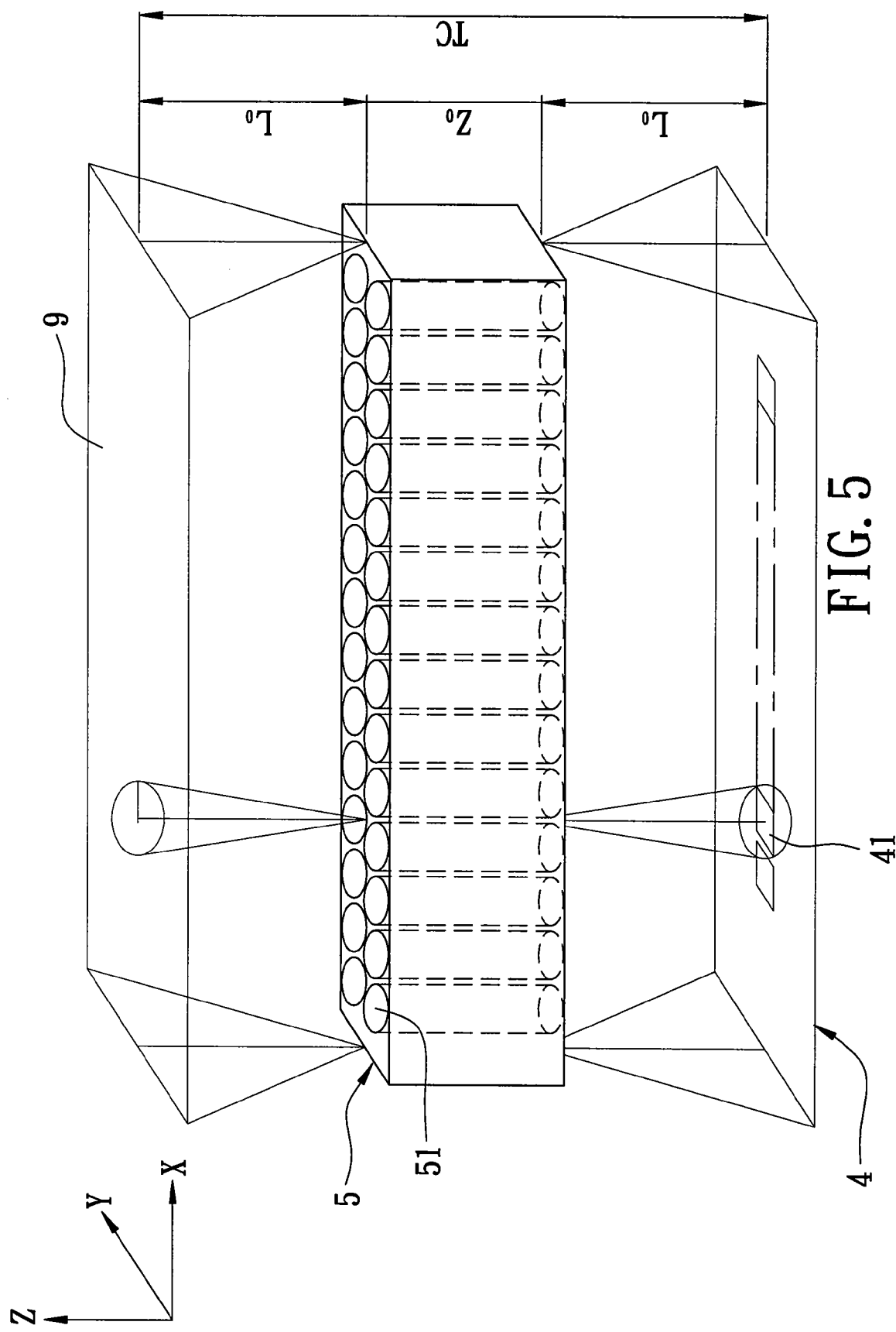
FIG. 5 is a schematic view, illustrating distances associated with a lens unit of the light-emitting module of FIG. 3.
Figure 6B:
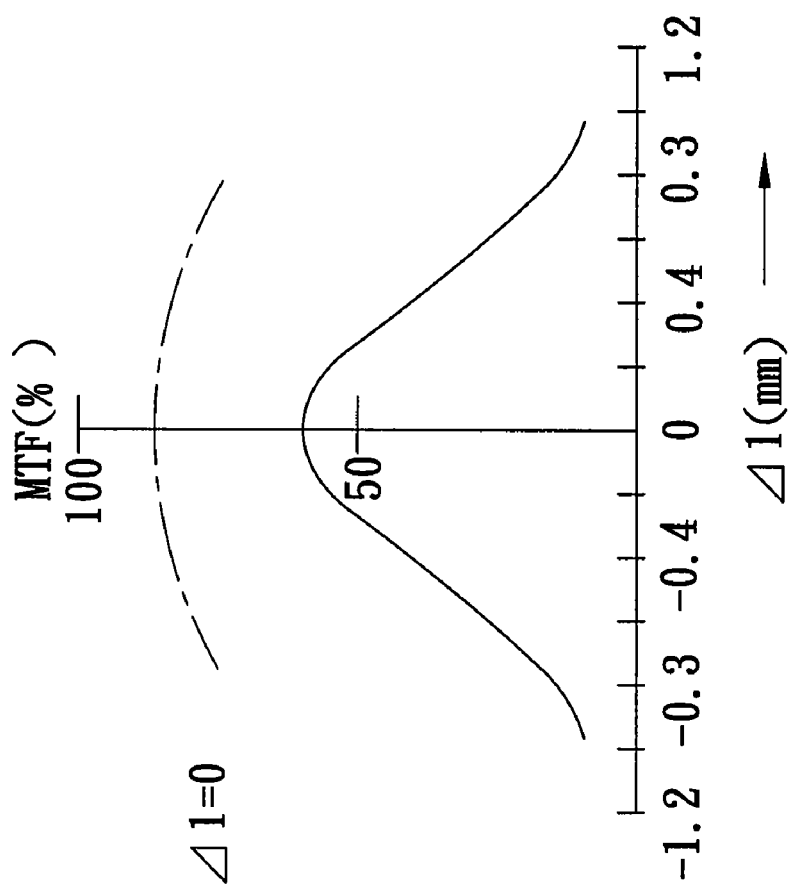
FIGS. 6A and 6B respectively illustrate changes in an image distance of the conventional lens unit and corresponding variations in modulation transfer function (MTF) values.
Figure 6A:
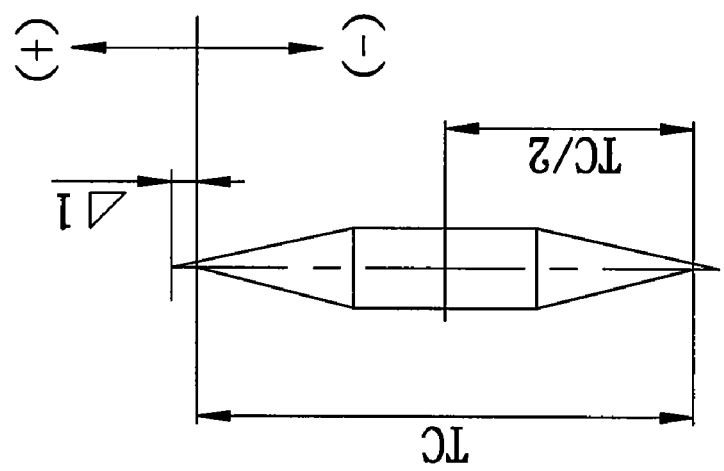
Figure 7B:
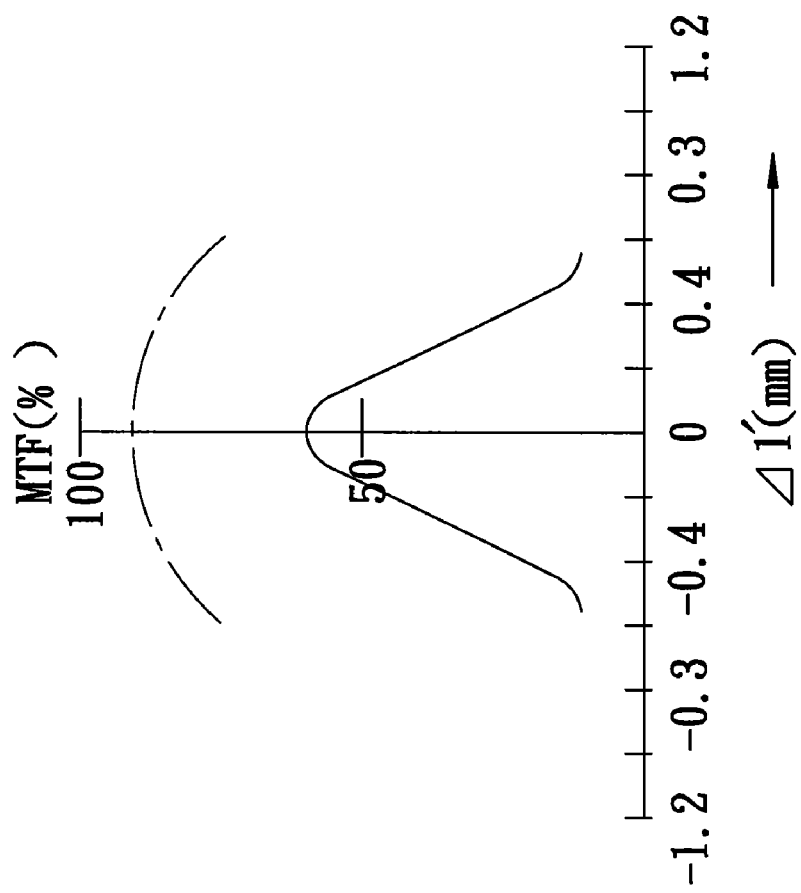
FIGS. 7B and 7B respectively illustrate changes in relative positioning between a conventional lens unit and light-emitting unit and corresponding variations in MTF values.
Figure 7A:
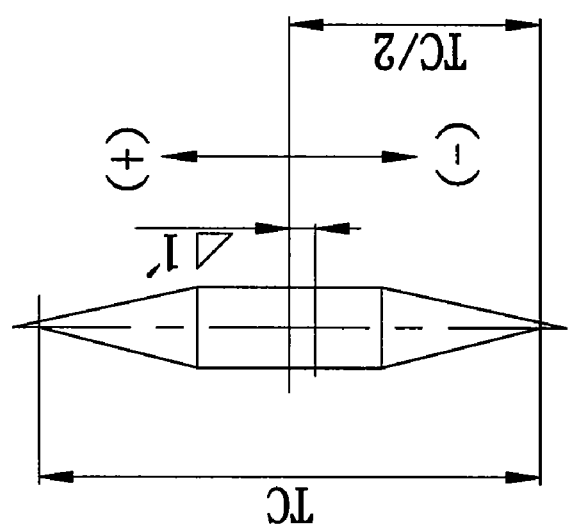

Referring to FIG. 5, the lens unit 5 includes a plurality of columnar lenses 51 arranged side-by-side along the first direction (X) and each having a lens axis extending along the optical path (Z). Each of the columnar lenses 51 has a gradually changing refractive index and can focus light. A distance (object distance) $L_0$ between one of the light-emitting points 41 and where the light emitted from the one of the light-emitting points 41 reaches the corresponding columnar lens 51 is substantially equal to a distance (image distance) $L_0$ between where the light exits the corresponding columnar lens 51 and is refracted onto the imaging plane 9 after being focused. Further, a distance that light must travel through each of the columnar lenses 51 along the optical path (Z) is a lens length $Z_0$. Therefore, a total optical path length (TC) from where light is emitted from the light-emitting points 41, passes through the lens unit 5, and reaches the imaging plane 9 along the optical path (Z) is twice the object or image distance $L_0$ plus the lens length $Z_0$, that is, $TC=2L_0+Z_0$.

An important indicator of performance with respect to the ability of a light-emitting module to emit light is the modulation transfer function (MTF), which describes the ability of an optical system or element to transfer contrast. The higher the MTF (typically given in percentage), the better the imaging quality of an optical system or element.

Referring to FIGS. 5, 6A, 6B, 7A, and 7B, it is evident that with any slight variation in the image distance (FIGS. 6A and 6B) or relative positioning between the lens unit 5 and the light-emitting unit 4 (FIGS. 7A and 7B), MTF (%) is significantly reduced. That is, in the conventional active alignment process, only a slight deviation from the intended or optimal alignment position significantly reduces MTF (%). However, referring to FIGS. 5 and 8A and 8B, if ½ ($Z_0$) is made to coincide with ½ (TC), the total optical path length (TC) is maintained within a predetermined range, and MTF (%) stays within a relatively close range of values with any shift of the total optical path length (TC) position.

Optical alignment and assembly methods according to preferred embodiment of the present invention will now be described.

Figure 9:
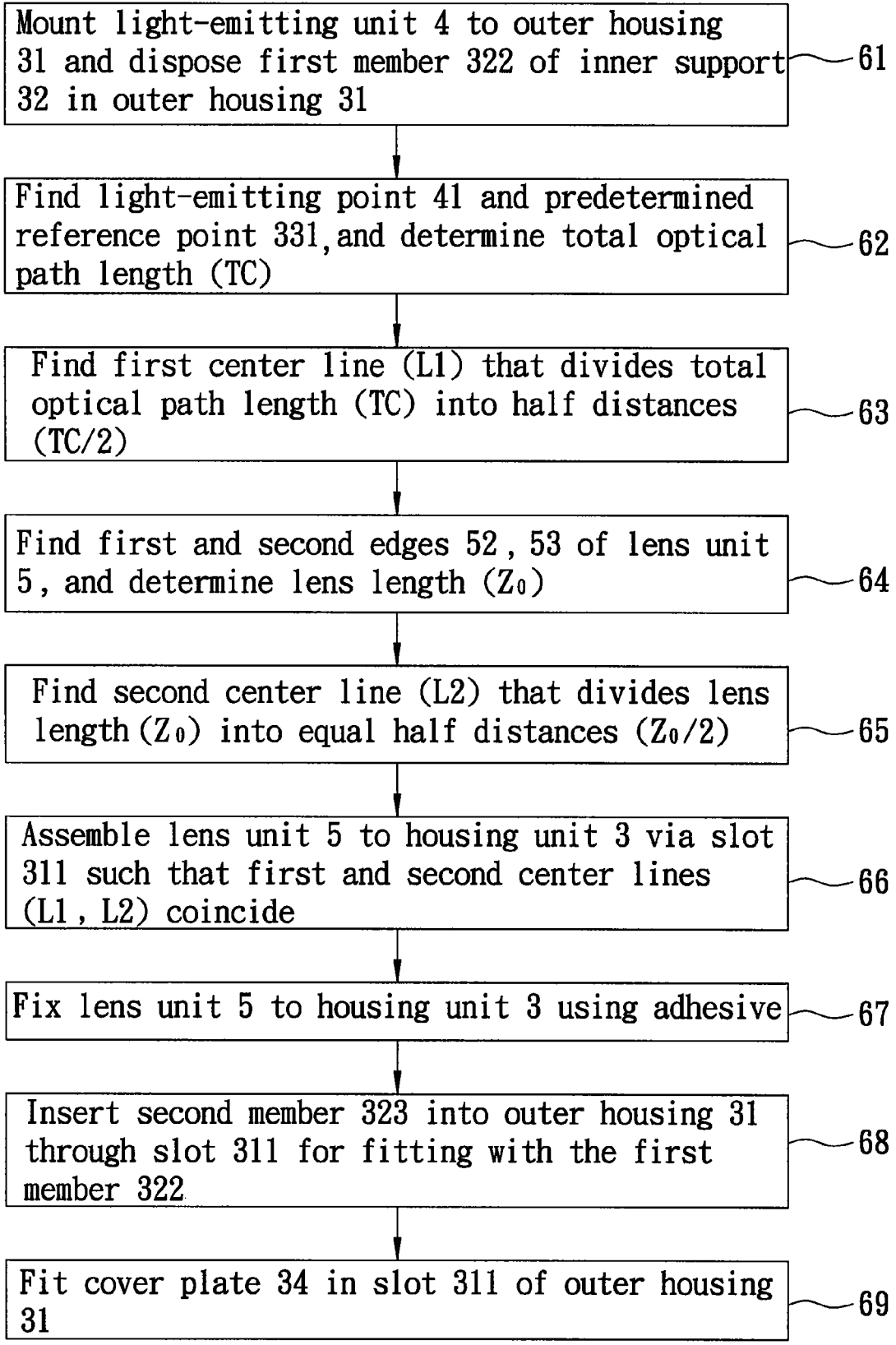
FIG. 9 is a flow chart of optical alignment and assembly processes according to a preferred embodiment of the present invention.
Figure 10:
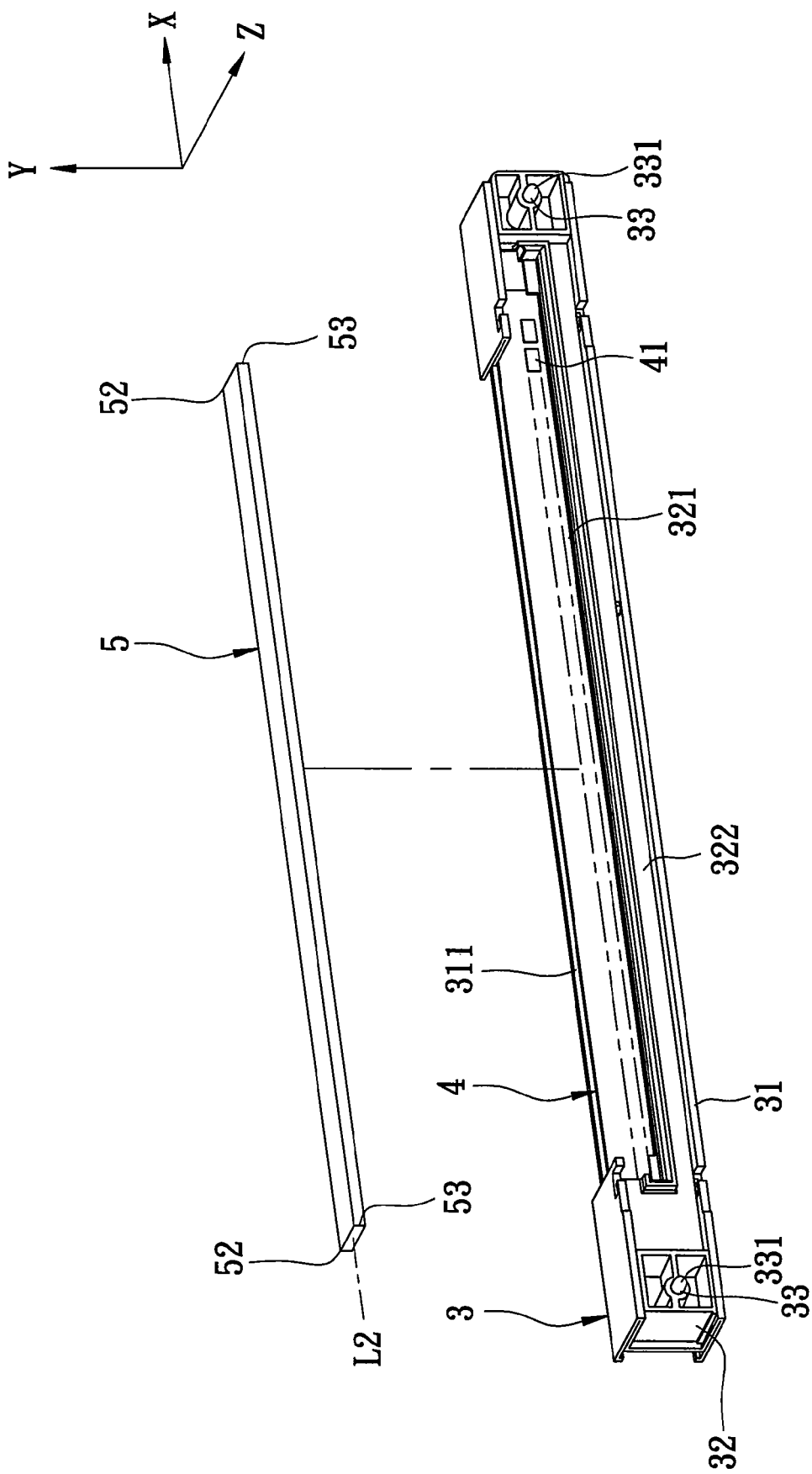
FIGS. 10 and 11 are exploded perspective views used to describe assembly of the preferred embodiment.

In step 61, referring to FIGS. 9 and 10, the light-emitting unit 4 is mounted in the outer housing 31, after which the first member 322 of the inner support 32 is fitted within the outer housing 31, such that the light-emitting points 41 of the light-emitting unit 4 and a wall of the first member 322 defining one side of the groove 321 are exposed through the slot 311 in the outer housing 31. With the light-emitting unit 4 thus disposed, the slot 311 is on a plane parallel to the optical path (Z).

Figure 12:
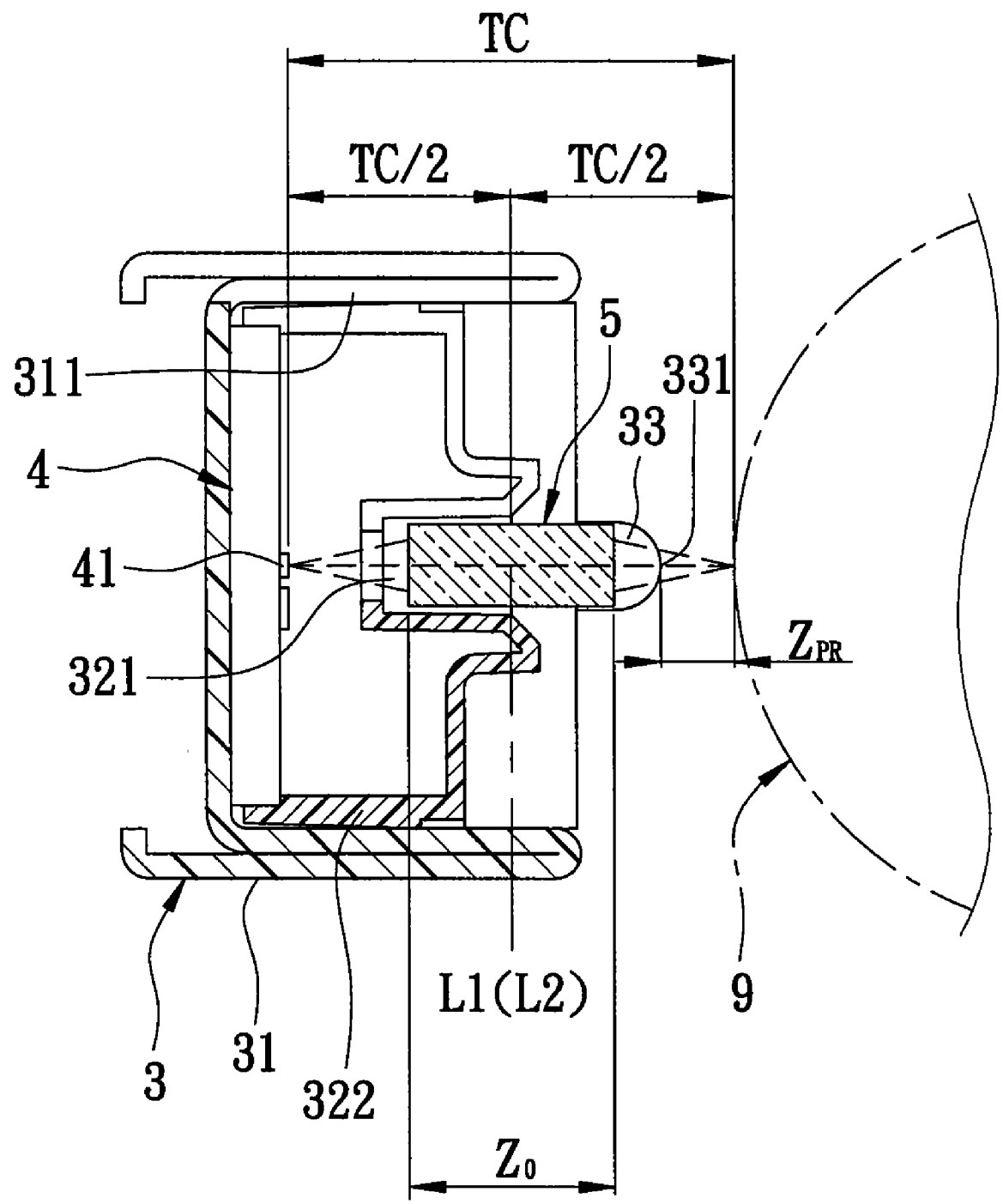
FIG. 12 is a sectional view of the preferred embodiment in an assembled state, illustrating emission of light from the lens unit onto an imaging plane.

In step 62, referring to FIGS. 9, 10, and 12, through image-capturing techniques and via the slot 311 in the housing 3, one of the light-emitting points 41 and a corresponding predetermined reference point 331 are found, and the total optical path length (TC) between the light-emitting point 41 and the imaging plane 9 is determined. In this embodiment, charge-coupled devices (CCDs) are used to perform image capturing, and the light-emitting point 41 and the predetermined reference point 331 are captured using one or more CCDs through the slot 311 and along a second direction (Y), which is perpendicular to the first direction (X) and the optical path (Z). Further, in this embodiment, an end of either one of the fasteners 33 is used as the predetermined reference point 331. Since each of the fasteners 33 has a predetermined distance relation with the imaging plane 9, i.e., a predetermined spacing ($Z_{PR}$) is present between the predetermined reference points 331 and the imaging plane 9 along the direction of the optical path (Z), the total optical path length (TC) from the light-emitting points 41 to the imaging plane 9 may be determined by adding this spacing ($Z_{PR}$) to the distance between the one of the light-emitting points 41 and the corresponding predetermined reference point 331 obtained through use of the CCDs.

In step 63, with reference to FIGS. 9 and 12, an imaginary first centerline (L1) is found that is located at a position that divides the total optical path length (TC) into equal half distances (TC/2). In this embodiment, the imaginary first center line (L1) extends along the first direction (X) and intersects the opposite ends of the housing unit 3.

Next, in step 64, with reference to FIGS. 9 and 10, through image-capturing techniques, a first edge 52 and a second edge 53 of the lens unit 5 are found, and the lens length ($Z_O$) between the first and second edges 52, 53 is determined. In this embodiment, charge-coupled devices (CCDs) are used to perform image capturing of the lens unit 5. Further, in this embodiment, the first and second edges 52, 53 extend along the first direction (X) and are intersected by the optical path (Z).

Figure 11:
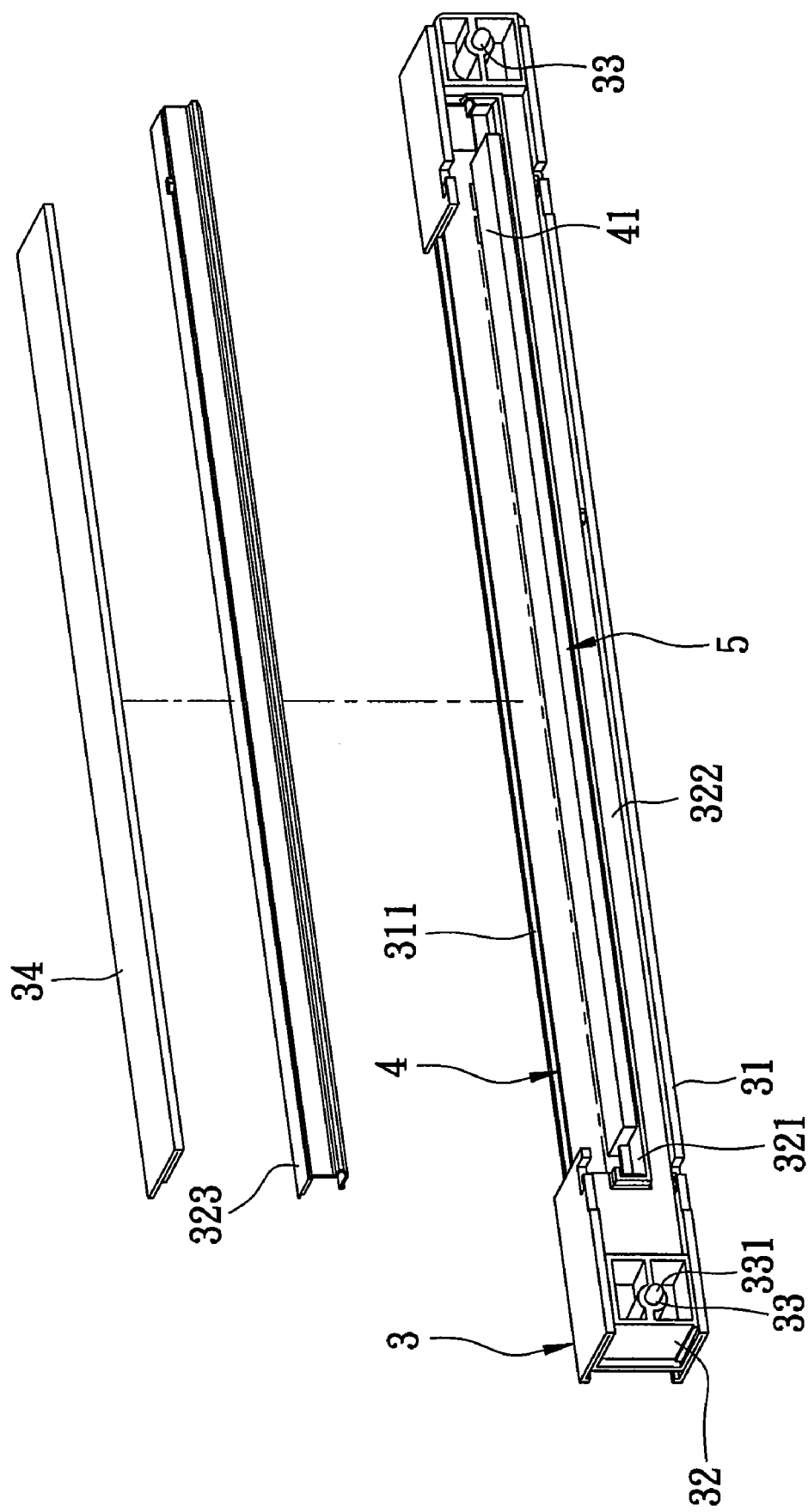

In step 65, with reference to FIGS. 9, 11, and 12, an imaginary second center line (L2) is found that is located at a position that divides the lens length ($Z_O$) into equal half distances ($Z_O/2$). In this embodiment, the imaginary second center line (L2) passes through opposite ends of the lens unit 5 between the first and second edges 52, 53.

In step 66, with reference to FIGS. 9, 10, and 11, the lens unit 5 is assembled to the housing unit 3 via the slot 311 in such a manner that the optical path (Z) passes through the lens unit 5. In this embodiment, an automatic pick-and-place machine (not shown) is used to pick up the lens unit 5, pass the lens unit 5 through the slot 311 in the outer housing 31 along the second direction (Y), and place the lens unit 5 against the wall of the first member 322 defining one side of the groove 321 in the inner support 32 in such a manner that the imaginary second center line (L2) of the lens unit 5 coincides with the imaginary first center line (L1).

In step 67, referring to FIGS. 9 and 11, the lens unit 5 is fixed to the first member 322 of the inner support 32 of the housing unit 3 after step 66 using an adhesive.

Figure 13:
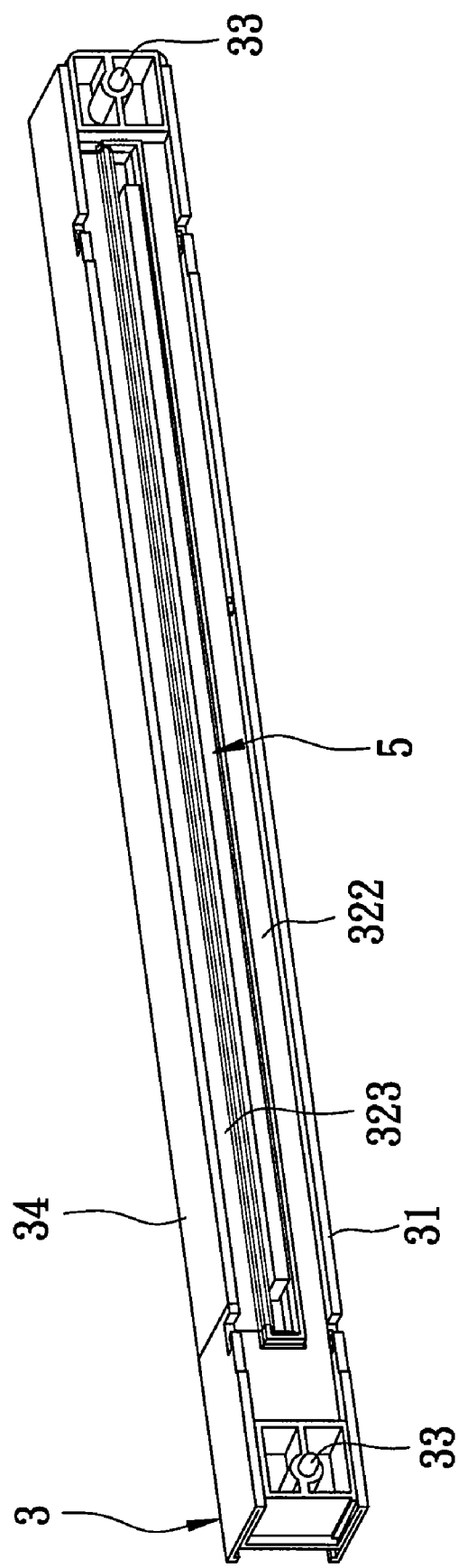
FIG. 13 is a perspective view of the preferred embodiment in a fully assembled state.

In step 68, referring to FIGS. 9, 11, and 13, the second member 323 is inserted into the outer housing 31 through the slot 311, and is fitted to the first member 322, such that the lens unit 5 is disposed in the groove 321 between the first and second members 322, 323.

In step 69, referring to FIGS. 9 and 13, the cover plate 34 is fitted in the slot 311 of the outer housing 31, thereby completing optical alignment and assembly of the light-emitting module.

Figure 8B:
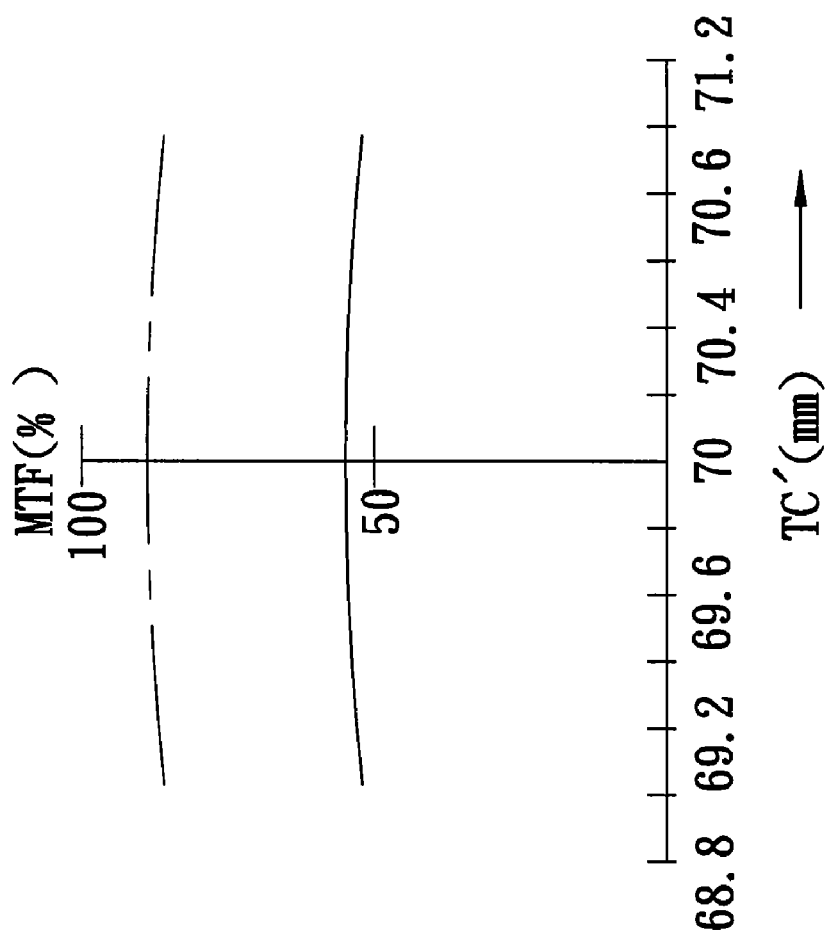
FIGS. 8A and 8B respectively illustrate maintaining of a total optical path length within a predetermined range when a ½ ($Z_0$) position is coincident with a ½ (TC) position in accordance with the present invention, and corresponding variations in MTF values with any change in the total optical path length position.
Figure 8A:
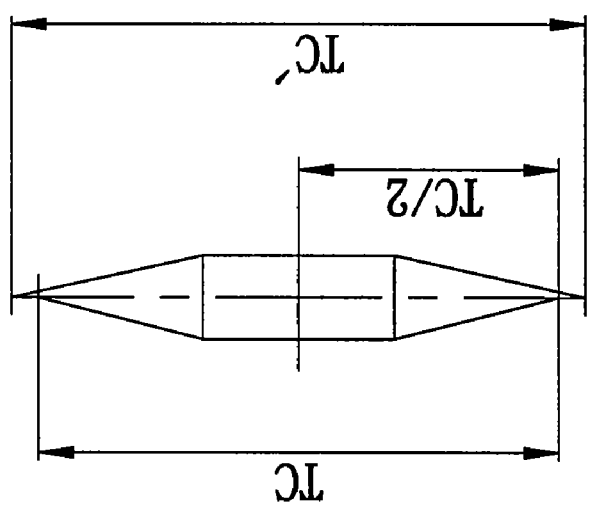

Referring to FIGS. 8A, 8B, and 12, the ½ ($Z_O$) position is coincident with the ½ (TC) position in the present invention. Therefore, even with variations in the total optical path length (TC), MTF (%) is maintained within a predetermined range of values. That is, in the optical alignment and assembly methods of the present invention, even with small variations between the imaging plane 9 and the light-emitting unit 4, good image quality is maintained.

The light-emitting module, and the optical alignment and assembly methods thereof of the present invention have the following advantages:

1. Only a simple pick-and-place operation is required for the lens unit 5. Hence, a typical surface-mount technology pick-and-place machine used for electronic components or semiconductor dice may be used to perform optical alignment and assembly in a very short time of, for example, ten seconds or less. As a result, the number of steps involved in, and the time required for, optical alignment and assembly in the present invention are significantly reduced, thereby enhancing productivity.

Figure 1:
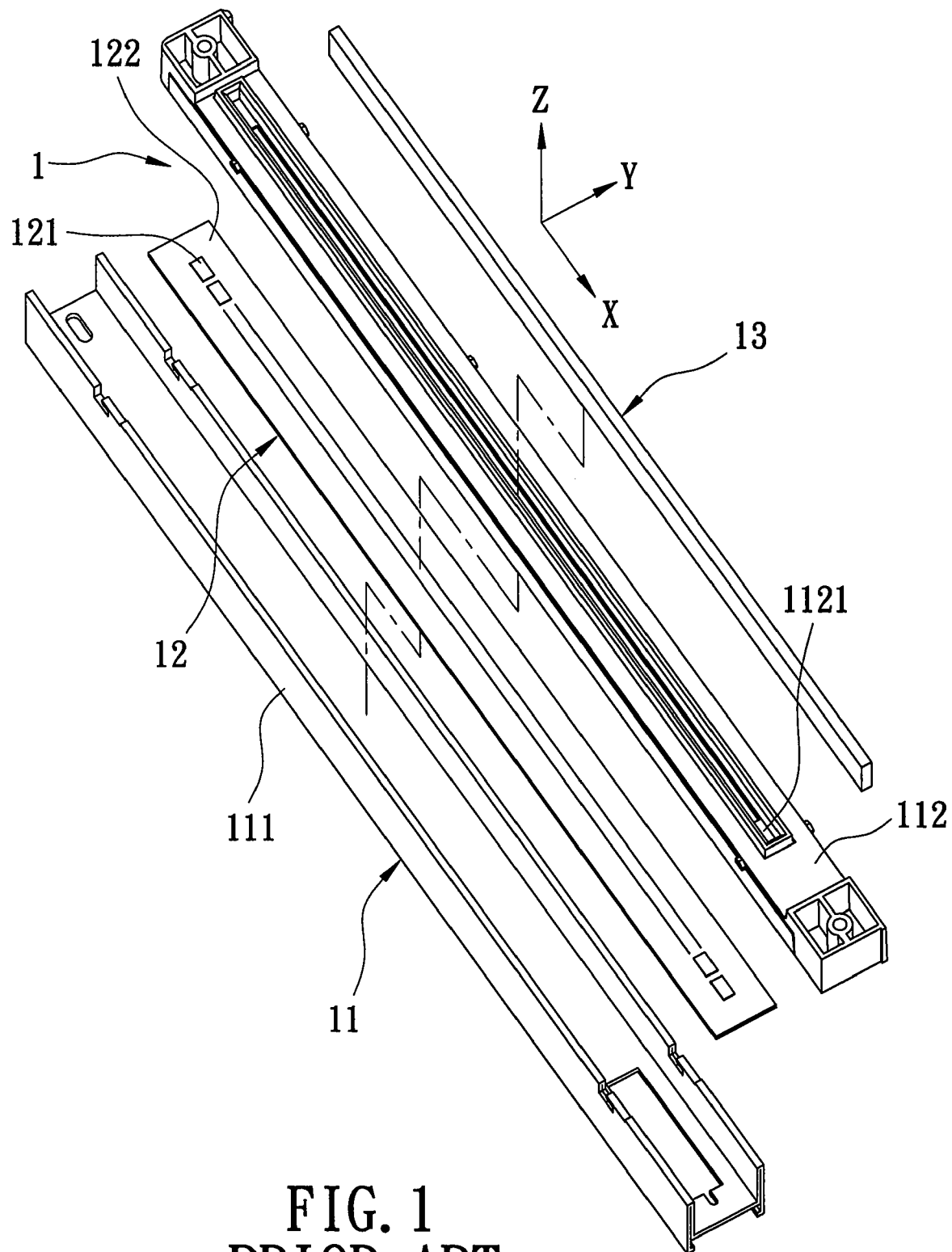
FIG. 1 is an exploded perspective view of a conventional light-emitting module utilizing a light-emitting diode array as a light source.
Figure 2:
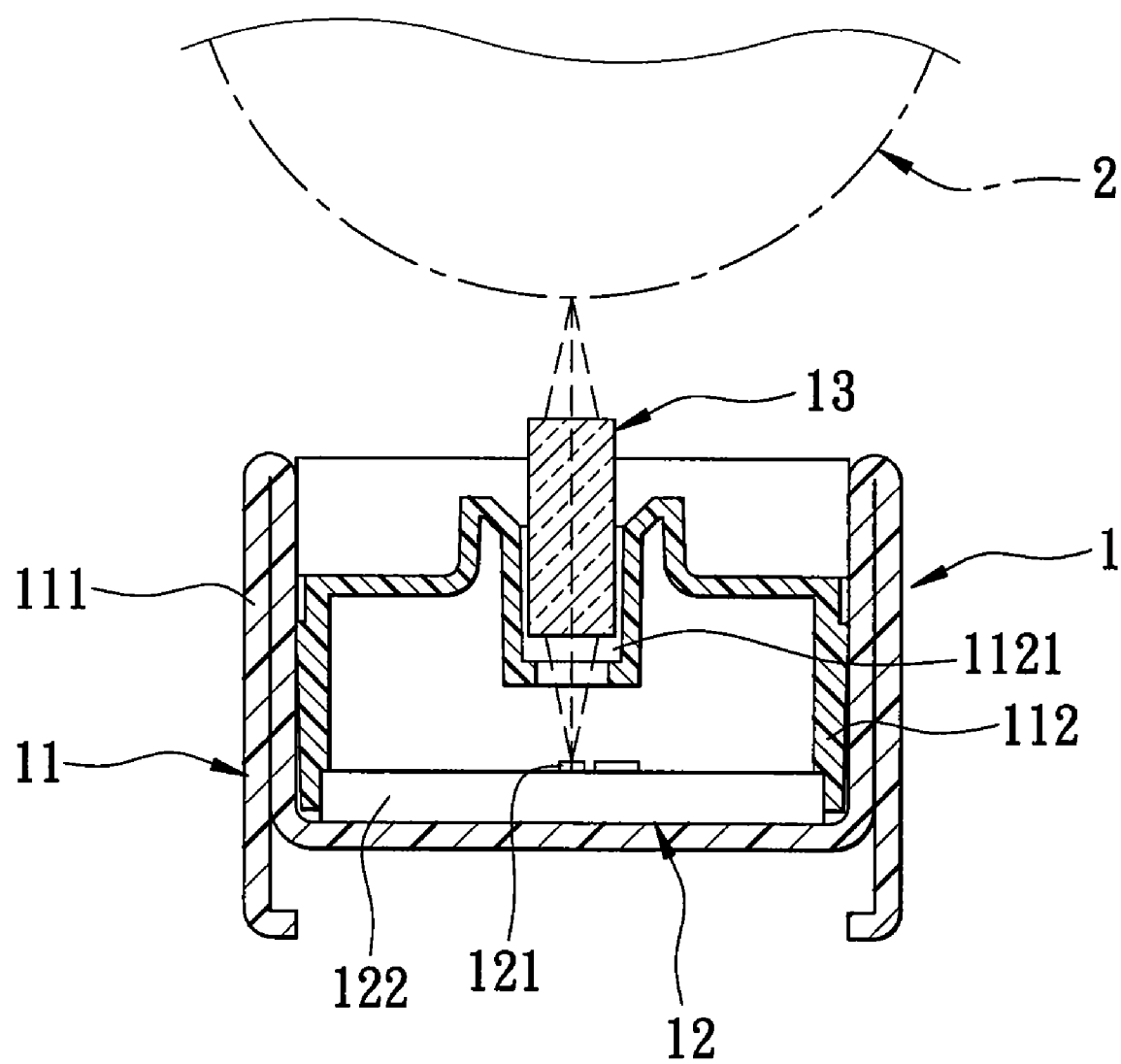
FIG. 2 is a sectional view of the light-emitting module of FIG. 1 in an assembled state, illustrating emission of light from a lens unit onto an imaging plane.

2. The measurement platform used for optical quality control utilized in active alignment of the conventional light-emitting module 1 (see FIGS. 1 and 2) is not required in the present invention, and the light-emitting points 41 of the present invention do not need to be illuminated during testing as in the case of the conventional optical alignment and assembly method. Hence, equipment requirements and costs are kept to a minimum, ultimately reducing the cost of the light-emitting module of the present invention.

3. The present invention can realize an optical system that approaches the theoretical maximum value for MTF (%) regardless of whether small variations in position occur as discussed above. Hence, a high resolution is achieved for the optical system to which the light-emitting module of the present invention is applied. Furthermore, such high quality may be ensured for all the light-emitting modules produced since small positional variations do not (or very minimally) affect optical quality.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical alignment method for a light-emitting module that includes a housing unit, a light-emitting unit disposed in the housing unit, and a lens unit, said optical alignment method comprising:
   (a) through image-capturing techniques, finding a light-emitting point of the light-emitting unit and a predetermined reference point, and determining a total optical path length between the light-emitting point and an imaging plane having a predetermined distance relation with the predetermined reference point;
   (b) finding an imaginary first center line located at a position that divides the total optical path length into equal half distances;
   (c) through image-capturing techniques, finding first and second edges of the lens unit that are opposite to each other in a direction of an optical path of light emitted by the light-emitting unit from the light-emitting point to the imaging plane, and determining a lens length between the first and second edges;

(d) finding an imaginary second center line located at a position that divides the lens length into equal half distances; and (e) assembling the lens unit to the housing unit in such a manner that the imaginary second center line coincides with the imaginary first center line.

2. The optical alignment method of claim 1, wherein, in step (a) and step (c), a charge-coupled device is used to perform image capturing.

3. The optical alignment method of claim 1, wherein, in step (a), the predetermined reference point is provided on the housing unit and has a predetermined spacing from the imaging plane along the direction of the optical path, the total optical path length between the light-emitting point and the imaging plane being determined by adding the predetermined spacing to a distance between the light-emitting point and the predetermined reference point.

4. The optical alignment method of claim 3, wherein two of the predetermined reference points are located respectively on opposite ends of the housing unit, the imaginary first center line intersecting the opposite ends of the housing unit.

5. The optical alignment method of claim 1, wherein the imaginary second center line passes through opposite ends of the lens unit between the first and second edges.

6. An assembly method for a light-emitting module that includes a light-emitting unit having a light-emitting point that emits light along an optical path, a housing unit formed with a slot, and a lens unit having opposite first and second edges, said assembly method comprising:

(a) mounting the light-emitting unit in the housing unit such that the slot is on a plane parallel to the optical path;

(b) through image-capturing techniques and via the slot in the housing unit, finding the light-emitting point and a predetermined reference point, and determining a total optical path length between the light-emitting point and an imaging plane having a predetermined distance relation with the predetermined reference point;

(c) finding an imaginary first center line located at a position that divides the total optical path length into equal half distances;

(d) through image-capturing techniques, finding the first edge and the second edge of the lens unit, and determining a lens length between the first and second edges;

(e) finding an imaginary second center line located at a position that divides the lens length into equal half distances; and (f) assembling the lens unit to the housing unit via the slot in such a manner that the optical path passes through the lens unit and that the imaginary second center line coincides with the imaginary first center line.

7. The assembly method of claim 6, further comprising fixing the lens unit to the housing unit after step (f) using an adhesive.

8. The assembly method of claim 6, wherein, in step (f), a pick-and-place machine is used to control placement of the lens unit in the housing unit.

* * * * *